United States Patent Office 3,655,770
Patented Apr. 11, 1972

3,655,770
PROCESS OF PRODUCING SALICYLALDEHYDE
Frank Cyril Buckley, Healdgreen, England, assignor to Ciba-Geigy AG, Basel, Switzerland
No Drawing. Filed May 5, 1969, Ser. No. 821,965
Int. Cl. C07c 45/00
U.S. Cl. 260—600
9 Claims

ABSTRACT OF THE DISCLOSURE

A process for the preparation of salicylaldehyde, comprising the acid hydrolysis of tri-(o-dichloromethyl phenyl)phosphate to salicylaldehyde is described. The sodium salt of a condensation product of naphthalene sulfonic acid and formaldehyde is added during the hydrolysis, whereby contamination of the reaction vessel by a hard, red by-product resin is avoided.

The present invention relates to a process for the preparation of salicylaldehyde and in particular to an improved process for the hydrolysis of tri-(o-dichloromethyl phenyl)phosphate to salicylaldehyde.

It is known to prepare salicylaldehyde first by chlorination of an ester of o-cresol, for example the carbonate, phosphate or arylsulphonate, followed by the alkaline hydrolysis of the resulting o-(dichloromethyl)phenol ester. In U.S. patent specification No. 3,314,998 there is described the hydrolysis of the o-(dichloromethyl) phenol ester in the presence of alkali-free liquid water to prepare salicylaldehyde. However, when salicylaldehyde is prepared by the acid hydrolysis of o-(dichloromethyl)phenol esters less satisfactory results are obtained due to a red by-product resin building up in a relatively hard form which is built up and contaminates the reaction vessel, adhering firmly to the walls of the later.

We have surprisingly found that this red by-product resin may readily be maintained in a readily dispersible form by the addition to the reaction mixture of a certain agent for preventing accumulation of the resin; the resin then precipitates as sand in the form of discrete particles which are readily filtered.

According to the present invention, there is provided a process of producing salicylaldehyde which comprises acid hydrolysis of tri-(o-dichloromethyl phenyl)phosphate to which sodium salt of the condensation product of naphthalene sulphonic acid and formaldehyde has been added.

This aforesaid agent may be obtained by neutralising and drying the condensation product of 1 molar proportion of naphthalene sulphonic acid and 0.77 molar proportion of formaldehyde at 80° to 100° C. it may be used in amount in the range of from 0.05% to 10% by weight based on the weight of the aforesaid phosphate, but preferably from 0.1% to 5% and especially from 0.5% to 2.5% by weight based on the weight of the phosphate.

The acid used in the process of the present invention may be for example, sulphamic acid, para toluene sulphonic acid, acetic acid, phosphoric acid or hydrochloric acid but sulphuric acid is especially desirable.

The acid may be used in the form of a dilute aqueous solution. In the case of sulphuric acid an 8% aqueous solution is desirable, although concentrations higher or lower than this may also be used, which are preferably in the range of from 5% to 10%. The amount of such aqueous sulphuric acid may vary within wide limits but is conveniently between 1.5 and 5.0 times the amount of the phosphate to be hydrolyzed on a weight to weight basis.

The resin accumulation-preventing agent used in the process of the invention may, if desired, be used in the presence of surface-active agents, for instance, dodecyl benzene sulphonic acid. The additional surface-active agent may be used in varying proportions, for instance, in an amount substantially equal to the sodium salt of the condensation product of naphthalene sulphonic acid and formaldehyde.

If desired an antifoaming agent may be added to the mixture and where the additional surface-active agent is dodecylbenzene sulphonic acid Silicone Antifoam M 430 was added.

The tri-(o-dichloromethyl phenyl)phosphate used in the process of the present invention may conveniently be produced by the chlorination of tri-o-tolyl phosphate, for instance by using gaseous chlorine at a temperature between 120° and 180° C. If desired, the reaction may be carried out in the presence of ultraviolet light.

The salicylaldehyde produced may be used for a variety of purposes, for instance, to produce chelating agents and corrosion inhibitors by condensation with diamines.

The following examples further illustrate the present invention. Parts by weight shown therein bear the same relation to parts by volume as do kilograms to litres. Parts and percentages are expressed by weight unless otherwise stated.

EXAMPLE 1

(a) 920 parts of distilled tri(o-tolyl)phosphate were placed in a flanged reactor fitted with a lid having a centre neck for a stirrer and three other necks around it in which are fitted a gas inlet tube, a contact thermometer covering the range 0–200° C. and a reflux condenser. The flask was weighed with the lid, stirrer and gas inlet tube in position and with a stopped and a calcium chloride tube in place of the contact thermometer and the condenser.

The reactor contents were stirred by agitation at 500 revolutions per minute. The ester was heated to 180° C. by means of a heating mantle and the temperature was maintained at this value by means of the contact thermometer which was set at 180° C.

When the temperature was steady, chlorine was passed into the ester, the rate being adjusted so that the gas was just being absorbed. After 9 hours, when the reaction was roughly three-quarters completed, the rate of uptake of chlorine dropped. The apparatus was then weighed to determine the degree of chlorination, the reaction being continued until the theoretical weight increase for the production of the hexachlorinated phosphate (517 parts) had been attained. The product was then allowed to cool in a dry environment. The yield of 1437.5 parts crude tri(o-dichloromethyl phenyl) phosphate corresponded to 100% theory.

(b) 287 parts of the crude tri(o-dichloromethyl phenyl) phosphate, 2.9 parts of the sodium salt of the condensation product of naphthalene sulphonic acid and formaldehyde and 750 parts of 8% aqueous sulphuric acid (prepared by admixing 63.1 grams sulphuric acid R.O.V. 94/95% and 687 grams of water) were charged into a reactor fitted with a paddle stirrer, thermometer pocket and a Dean and Stark trap connected to a water cooled condenser. The graduated limb of the Dean and Stark trap was filled with cold water and the reaction mixture was heated gradually to reflux by means of an electric heater. The stirrer was started when the internal temperature was 50° C. When the mixture began to boil, the heater was adjusted to produce a fast rate of reflux. The internal temperature was initially 100° C. and rose during the reaction time of 12 to 14 hours to 110° C.

Salicylaldehyde collected in the Dean and Stark trap as the lower layer and was run off periodically into a weighed flask. The yield of salicylaldehyde was 132 parts with an assay of 99%, which corresponded to 71% of theory. The red by-product resin formed in this reaction was maintained in a readily water-dispersible form which could be readily filtered off.

As a contrast with the above example, essentially the same procedure as described in Example 1(b) was followed but using 2.9 parts dodecyl benzene sulphonic acid instead of the sodium salt of the condensation product of naphthalene sulphonoic acid and formaldehyde there used. The red by-product resin built up on the walls of the reaction vessel. This contrast illustrates the advantage of the process of the present invention.

By following essentially the same procedure as described in Example 1(b) but excluding the sodium salt of the condensation product of naphthalene sulphonic acid and formaldehyde the red by-product resin was not dispersed; it built up in a hard form on the walls of the reaction vessel.

By following essentially the same procedure as described in Example 1(b) but using 2.9 parts of an alkyl aryl trimethyl ammonium chloride, e.g. octylphenyl trimethyl ammonium chloride, instead of the sodium salt of the condensation product of naphthalene sulphonic acid and formaldehyde, the red by-product resin was not dispersed; it built up in a hard form on the walls of the reaction vessel.

By following essentially the same procedure as described in Example 1(b) but using 2.9 parts of lauryl alcohol/ethylene oxide condensate instead of the sodium salt of the condensation product of naphthalene sulphonic acid and formaldehyde, the red by-product resin was not dispersed; it built up in a hard form on the walls of the reaction vessel.

EXAMPLE 2

By following essentially the same procedure as described in Example 1(b) but using 5.8 parts of a mixture containing equal parts of dodecyl benzene sulphonic acid and the sodium salt of the condensation product of naphthalene sulphonic acid and formaldehyde, with the addition of 2 parts of Silicone Antifoam M 430, salicylaldehyde was produced in a similar manner; the red by-product resin being maintained in a readily dispersible form which could readily be filtered off.

What I claim is:

1. In the process for preparing salicylaldehyde by the acid hydrolysis of tri(o-dichloromethyl phenyl) phosphate in an aqueous medium, the improvement comprising carrying out the reaction in the presence of from about 0.05% to about 10% by weight of the phosphate of a sodium salt of the condensation product of naphthalene sulphonic acid and formaldehyde, said condensation product is the neutralized and dried product of the condensation of naphthalene sulphonic acid and formaldehyde at 80° C. to 100° C. in a molar ratio of about 1:0.77.

2. A process as described in claim 1 wherein the condensation product is used in an amount within the range of from about 0.1% to 5% by weight based on the weight of the phosphate.

3. A process as described in claim 1 wherein the acid is in the form of an aqueous solution and is selected from sulphamic acid, para-toluene-sulphonic acid, acetic acid, phosphoric acid, hydrochloric acid and sulphuric acid.

4. A process as described in claim 1 wherein the acid is sulphuric acid in aqueous solution having a concentration within the range of from about 5% to 10%.

5. A process as described in claim 4 wherein the amount of aqueous sulphuric acid solution is between 1.5 and 5.0 times the amount of the phosphate on a weight to weight basis.

6. A process as described in claim 1 wherein the process is carried out in the presence of the surface-active agent dodecyl-benzene-sulphonic acid.

7. A process as described in claim 6 wherein the surface-active agent is added in an amount substantially equal to that of the sodium salt of the condensation product of naphthalene sulphonic acid and formaldehyde.

8. A process as described in claim 1 wherein an antifoaming agent is added to the reaction mixture.

9. A process as described in claim 1 wherein the tri-(o-dichloromethyl phenyl)phosphate is the reaction product of the chlorination of tri-o-tolyl phosphate.

References Cited

UNITED STATES PATENTS 3,314,998   4/1967   Levy et al. _____ 260—600

FOREIGN PATENTS 705,901   3/1965   Canada _____ 260—505 C

BERNARD HELFIN, Primary Examiner

U.S. Cl. X.R.

260—505